(12) United States Patent
Youn

(10) Patent No.: US 12,149,102 B2
(45) Date of Patent: Nov. 19, 2024

(54) WIRELESS POWER TRANSMISSION DEVICE, WIRELESS POWER RECEPTION DEVICE, AND AUTHENTICATION METHOD THEREFOR

(71) Applicant: LG ELECTRONICS INC., Seoul (KR)

(72) Inventor: Jinho Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 17/909,956

(22) PCT Filed: Mar. 8, 2021

(86) PCT No.: PCT/KR2021/002827
§ 371 (c)(1),
(2) Date: Sep. 7, 2022

(87) PCT Pub. No.: WO2021/182818
PCT Pub. Date: Sep. 16, 2021

(65) Prior Publication Data
US 2023/0107178 A1 Apr. 6, 2023

(30) Foreign Application Priority Data
Mar. 9, 2020 (KR) .......................... 10-2020-0029087

(51) Int. Cl.
*H02J 7/00* (2006.01)
*H02J 50/80* (2016.01)

(52) U.S. Cl.
CPC .......... *H02J 7/00045* (2020.01); *H02J 50/80* (2016.02)

(58) Field of Classification Search
CPC ........ H02J 7/00045; H02J 50/80; H02J 50/40; H04L 9/3265; H04L 9/3273; H04L 69/16
(Continued)

(56) References Cited

U.S. PATENT DOCUMENTS

2015/0006395 A1* 1/2015 Chu ....................... G06Q 20/40
705/44
2019/0386513 A1 12/2019 Bavisi et al.

FOREIGN PATENT DOCUMENTS

KR 10-2019-0006852 A 1/2019
KR 10-2019-0082891 A 7/2019
(Continued)

*Primary Examiner* — Richard Tan
(74) *Attorney, Agent, or Firm* — BRYAN CAVE LEIGHTON PAISNER LLP

(57) ABSTRACT

A wireless power reception device according to one embodiment of the present specification comprises: a power pickup circuit for receiving wireless power from a wireless power transmission device; and a communication/control circuit for communicating with the wireless power transmission device and controlling the transmission of the wireless power, wherein the communication/control circuit performs an authentication protocol of transmitting an authentication request message to the wireless power transmission device and receiving an authentication response message as a response to the authentication request message from the wireless power transmission device, receives, from the wireless power transmission device, a reset message for requesting the reset of the authentication protocol while performing the authentication protocol, and restarts the authentication protocol.

14 Claims, 21 Drawing Sheets

(58) Field of Classification Search
USPC .......................................................... 307/104
See application file for complete search history.

(56) References Cited

FOREIGN PATENT DOCUMENTS

| | | | |
|---|---|---|---|
| KR | 10-2020-0017308 | A | 2/2020 |
| WO | 2020-046533 | A | 3/2020 |

* cited by examiner

FIG. 3b

|  | b7 | b6 | b5 | b4 | b3 | b2 | b1 | b0 |
|---|---|---|---|---|---|---|---|---|
| Byte 0 | colspan="8" | Application Profile |||||||
| Byte 1 | Version ||||||||
| Byte 2-N-1 | Profile-specific data ||||||||

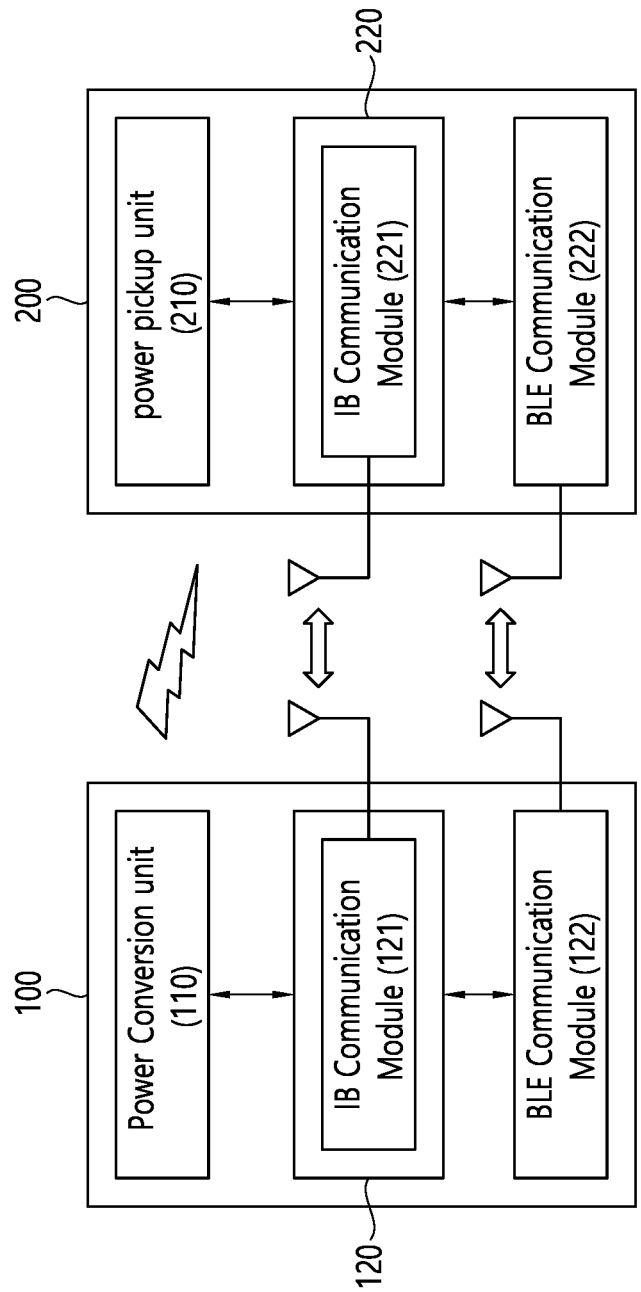

FIG. 16

| $b_7$ | $b_6$ | $b_5$ | $b_4$ | $b_3$ | $b_2$ | $b_1$ | $b_0$ |
|---|---|---|---|---|---|---|---|
| Authentication Protocol Version | | | | Message Type | | | |
| $B_0$ | | | | | | | |

FIG. 17

| | $b_7$ | $b_6$ | $b_5$ | $b_4$ | $b_3$ | $b_2$ | $b_1$ | $b_0$ |
|---|---|---|---|---|---|---|---|---|
| $B_0$ | Authentication Message Header |||||||||
| $B_1$ | Reset code |||||||||

FIG. 18

| | b7 | b6 | b5 | b4 | b3 | b2 | b1 | b0 |
|---|---|---|---|---|---|---|---|---|
| B0 | | | Authentication Message Header | | | | | |
| B1 | | | Error Code | | | | | |
| B2 | | | Error Date | | | | | |

WIRELESS POWER TRANSMISSION DEVICE, WIRELESS POWER RECEPTION DEVICE, AND AUTHENTICATION METHOD THEREFOR

BACKGROUND OF THE DISCLOSURE

Cross-Reference to Related Applications

This application is the National Stage filing under 35 U.S.C. § 371 of International Application No. PCT/KR2021/002827, filed on Mar. 8, 2021, which claims the benefit of Korean Patent Application No. 10-2020-0029087, filed on Mar. 9, 2020, the contents of which are all hereby incorporated by reference herein in their entirety.

Field of the Disclosure

The present specification relates to a wireless power transmitter, a wireless power receiver, and an authentication method between the wireless power transmitter and the wireless power receiver.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

An object of the present specification is to provide an efficient operation method of an authentication protocol between a wireless power receiver and a wireless power transmitter.

The technical problems of the present specification are not limited to the problems mentioned above, and other problems not mentioned will be clearly understood by those skilled in the art from the following description.

A wireless power receiver according to an embodiment of the present specification for solving the above problems comprises a power pickup circuit configured to receive the wireless power from the wireless power transmitter and a communication/control circuit configured to communicate with the wireless power transmitter and control a transmission of the wireless power, wherein the communication/control circuit is configured to perform an authentication protocol which transmits an authentication request message to the wireless power transmitter and receives an authentication response message in response to the authentication request message from the wireless power transmitter, receive, from the wireless power transmitter, a reset message requesting reset of the authentication protocol while performing the authentication protocol, restart the authentication protocol.

A wireless power receiver according to an embodiment of the present specification for solving the above problems comprises a power pickup circuit configured to receive the wireless power from the wireless power transmitter and a communication/control circuit configured to communicate with the wireless power transmitter and control a transmission of the wireless power, wherein the communication/control circuit is configured to perform an authentication protocol which transmits an authentication request message to the wireless power transmitter and receives an authentication response message in response to the authentication request message from the wireless power transmitter, transmit, to the wireless power transmitter, a reset message requesting reset of the authentication protocol while performing the authentication protocol, restart the authentication protocol.

A wireless power transmitter according to an embodiment of the present specification for solving the above problems comprises a power conversion circuit configured to transfer the wireless power to the wireless power receiver and a communication/control circuit configured to communicate with the wireless power receiver and control a transmission of the wireless power, wherein the communication/control circuit is configured to perform an authentication protocol which receives an authentication request message from the wireless power receiver and transmits an authentication response message in response to the authentication request message to the wireless power receiver, receive, from the wireless power receiver, a reset message requesting reset of the authentication protocol while performing the authentication protocol.

A wireless power transmitter according to an embodiment of the present specification for solving the above problems comprises a power conversion circuit configured to transfer the wireless power to the wireless power receiver and a communication/control circuit configured to communicate with the wireless power receiver and control a transmission of the wireless power, wherein the communication/control circuit is configured to perform an authentication protocol which receives an authentication request message from the wireless power receiver and transmits an authentication response message in response to the authentication request message to the wireless power receiver, transmit, to the wireless power receiver, a reset message requesting reset of the authentication protocol while performing the authentication protocol.

Other specific details of the document are included in the detailed description and drawings.

According to the embodiments of the present document, there are at least the following effects.

The wireless power transmitter and/or the wireless power receiver may immediately restart the authentication protocol by sending an authentication reset message if necessary even if a problem occurs during the authentication protocol.

Alternatively, mixing and/or confusion of data sent and received in the existing authentication protocol and data sent and received in the restarted authentication protocol is prevented.

The effect according to the present document is not limited by the contents exemplified above, and more various effects are included in the present specification.

BRIEF DESCRIPTION OF THE DRAWINGS

FIG. 3b shows an example of a WPC NDEF in a wireless power transfer system.

FIG. 4c is a block diagram illustrating a wireless power transfer system using BLE communication according to another example.

FIG. 16 is a diagram illustrating a header format of an authentication message according to an example.

FIG. 17 is a diagram illustrating a format of a reset message according to an example.

FIG. 18 is a diagram illustrating a format of an error message (ERROR) according to an example.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
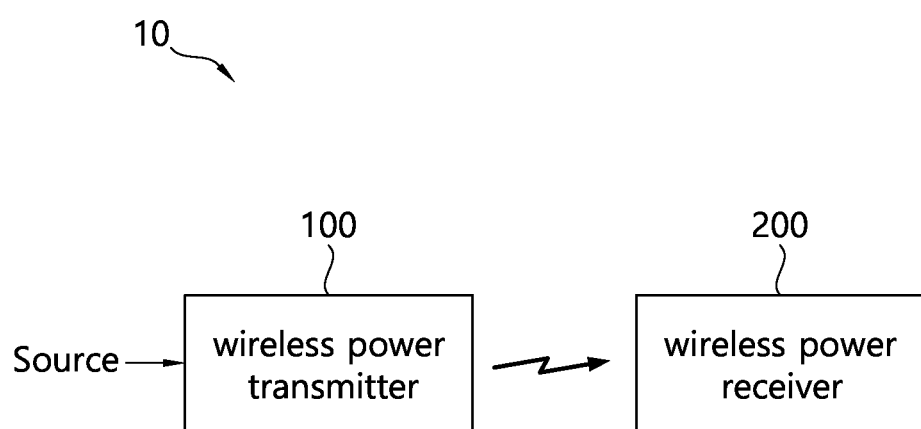
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
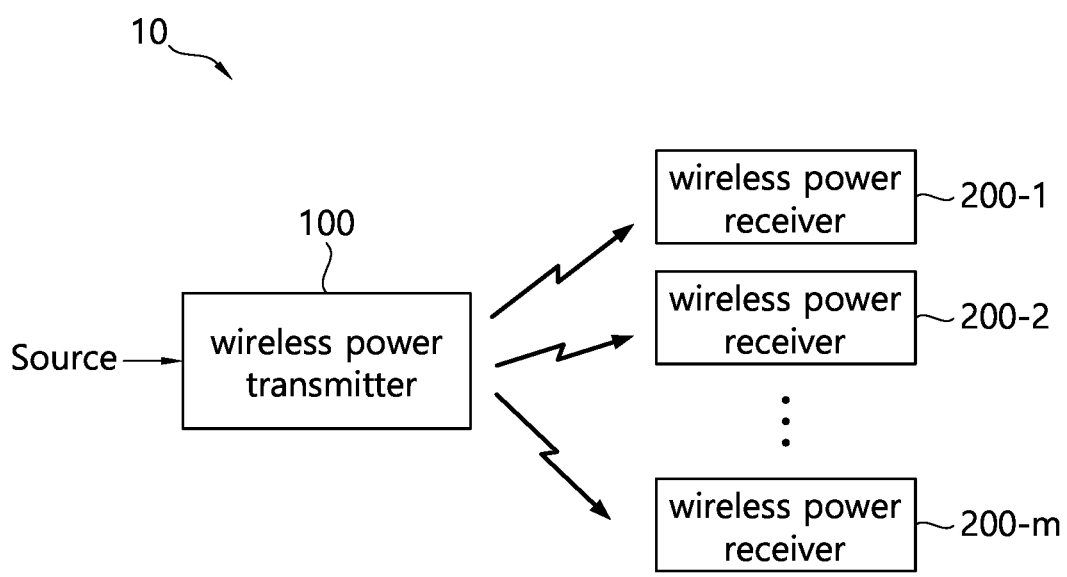
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
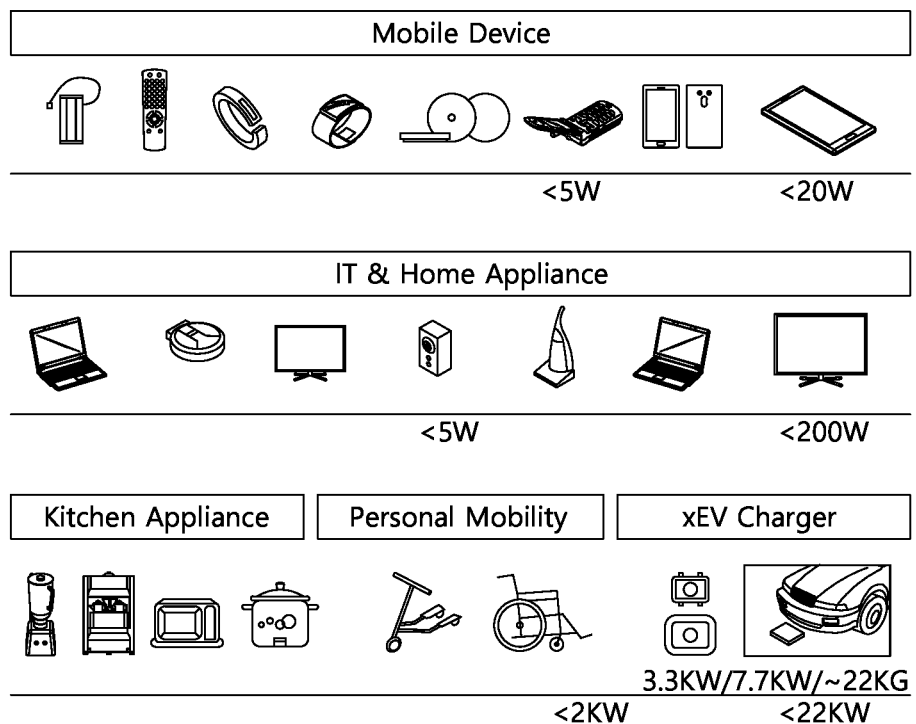
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
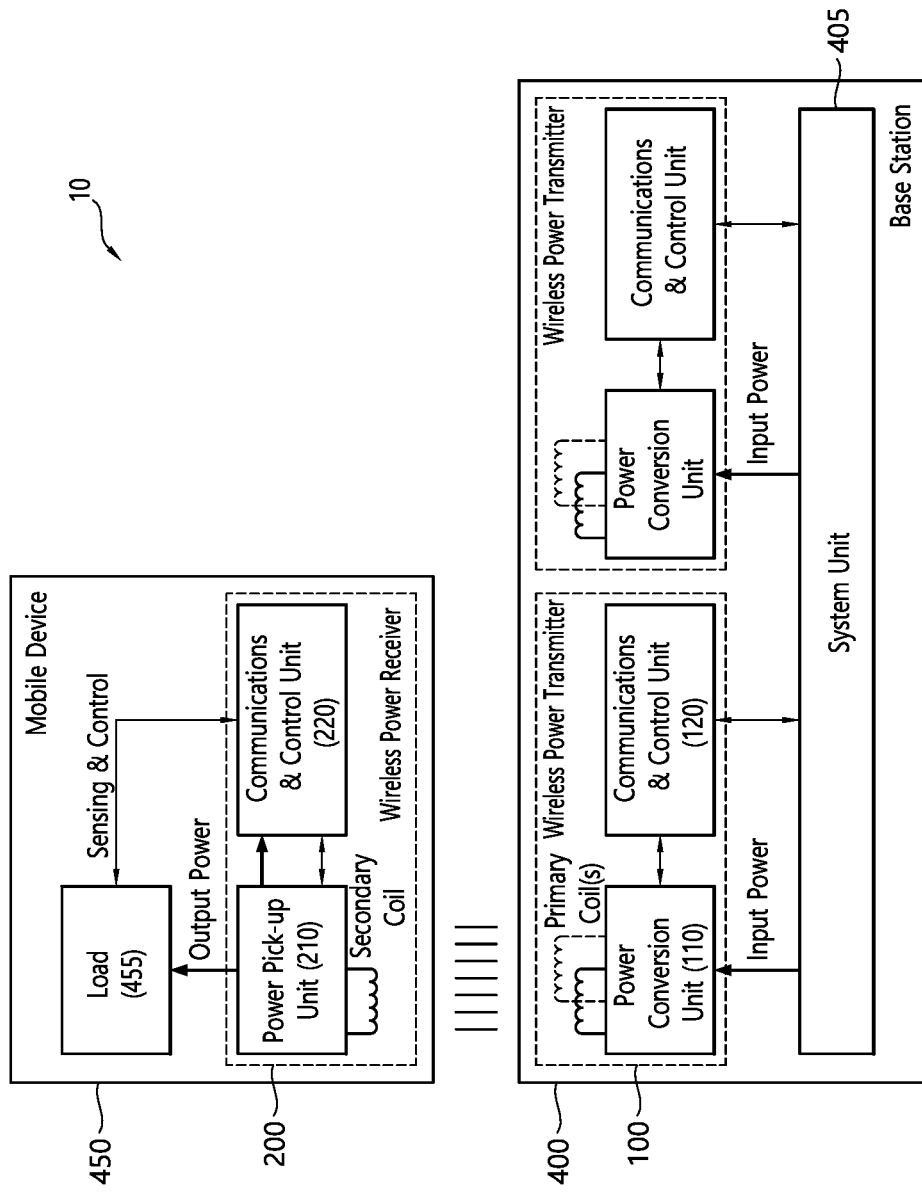
FIG. 4a is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying(FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying(FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Referring to FIG. 4a, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4B:
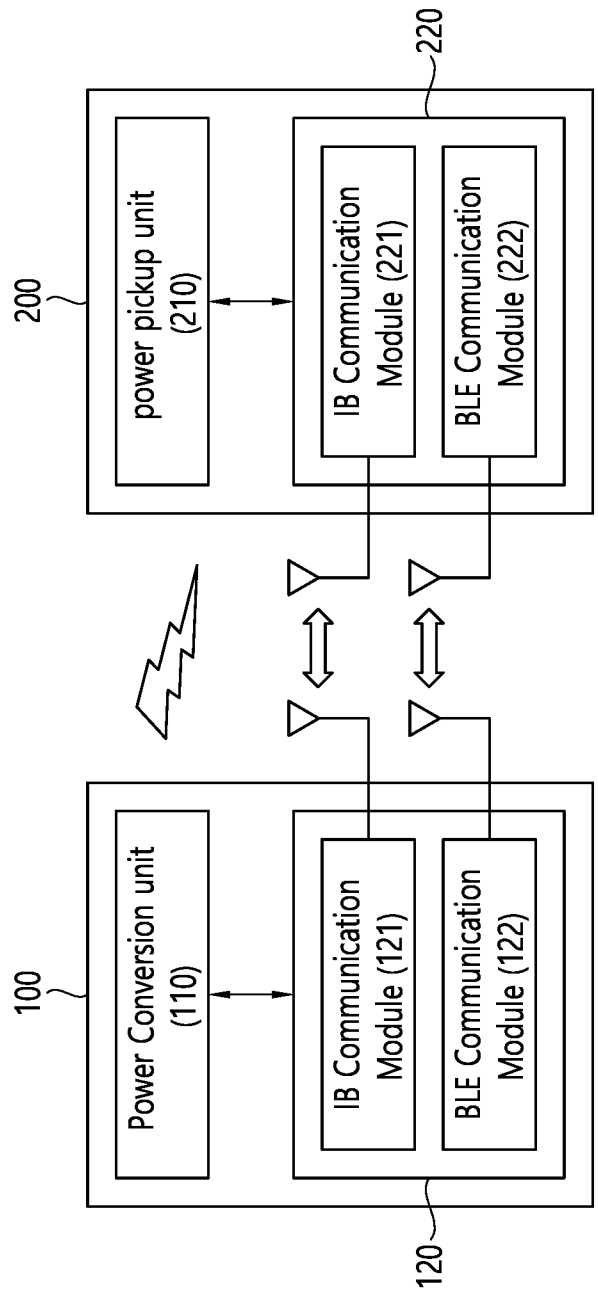
FIG. 4b is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4b.

FIG. 4b is a block diagram illustrating a wireless power transfer system using BLE communication according to an example.

Referring to FIG. 4b, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122, 222 perform the Bluetooth communication architecture and operation. For example, the BLE communication modules 122 and 222 establish a connection between the wireless power transmitter 100 and the wireless power receiver 200, it may be used to exchange control information and packets necessary for wireless power transmission.

In another aspect, the communication/control circuit 120 may be configured to operate a profile for wireless charging. Here, the profile for wireless charging may be GATT using BLE transmission.

FIG. 4c is a block diagram illustrating a wireless power transfer system using BLE communication according to another example.

Referring to FIG. 4c, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
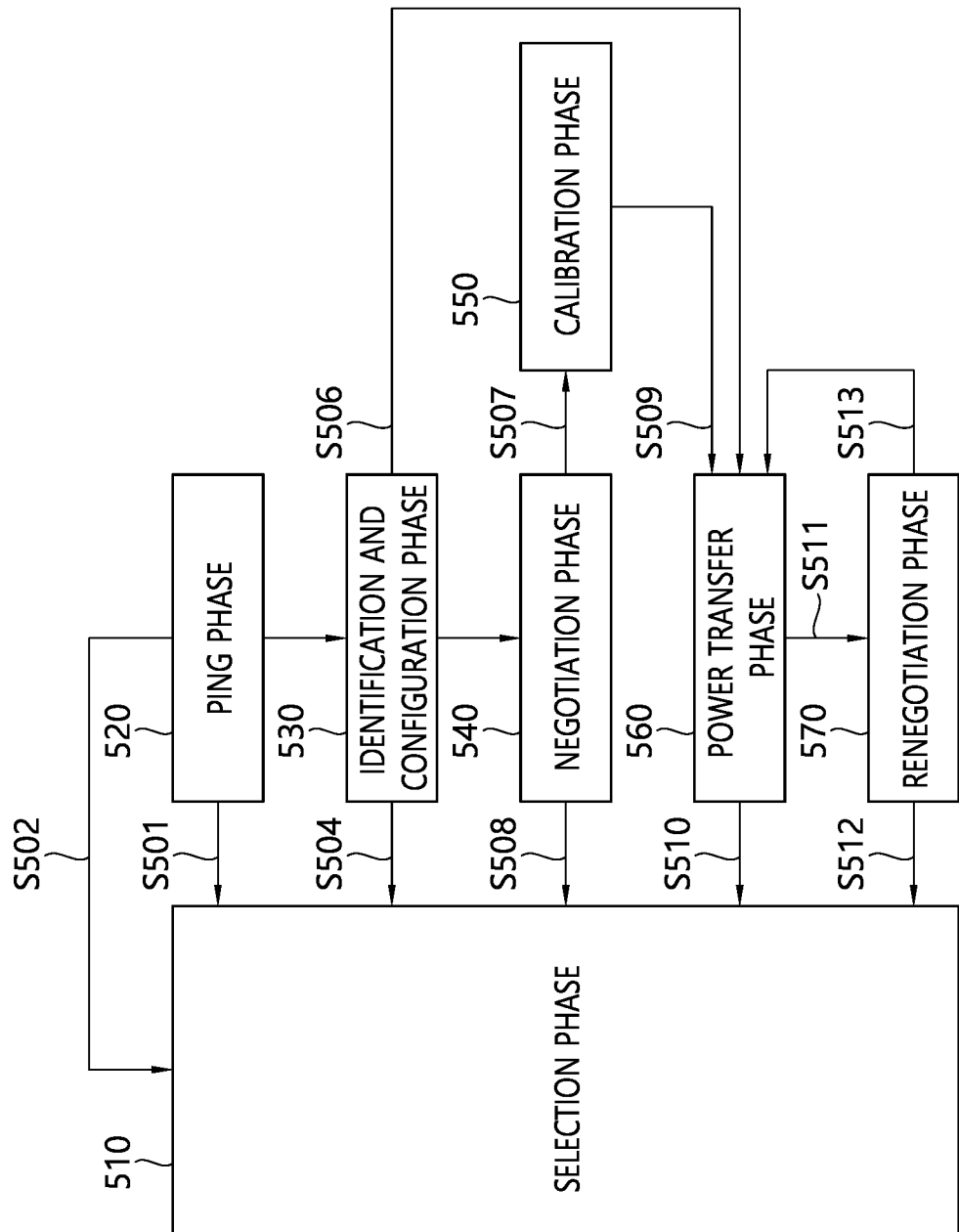
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal(or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
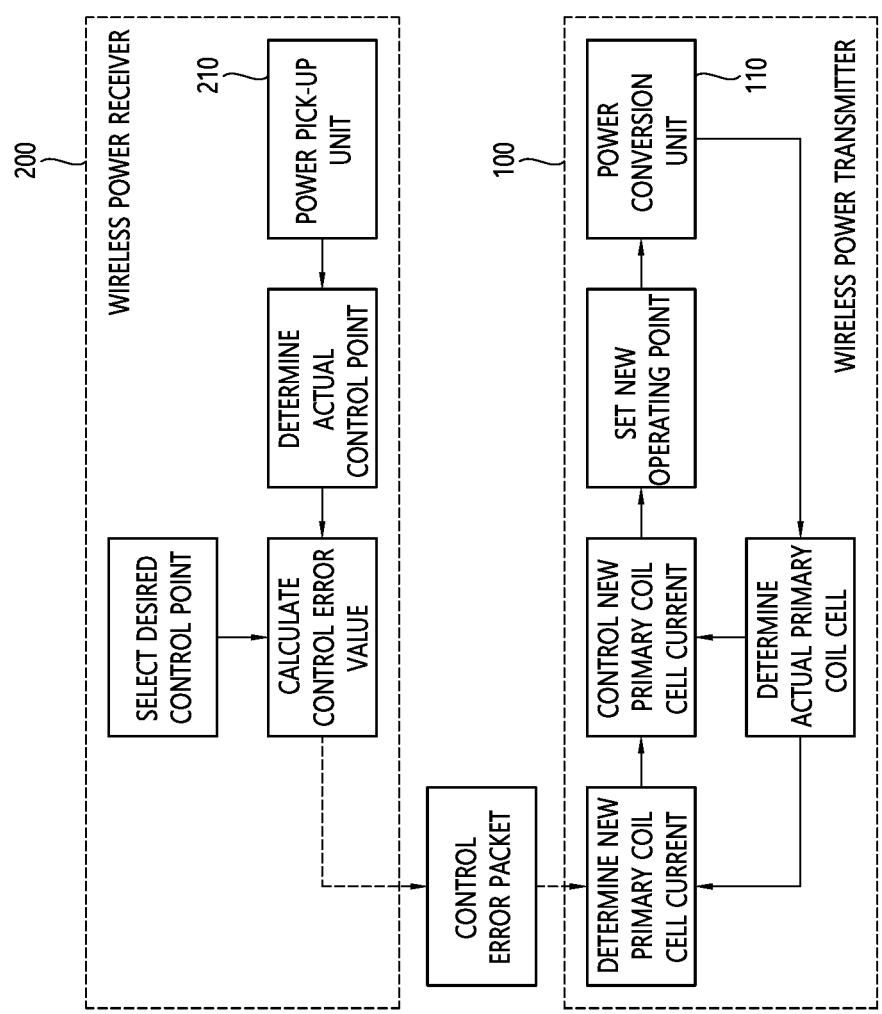
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
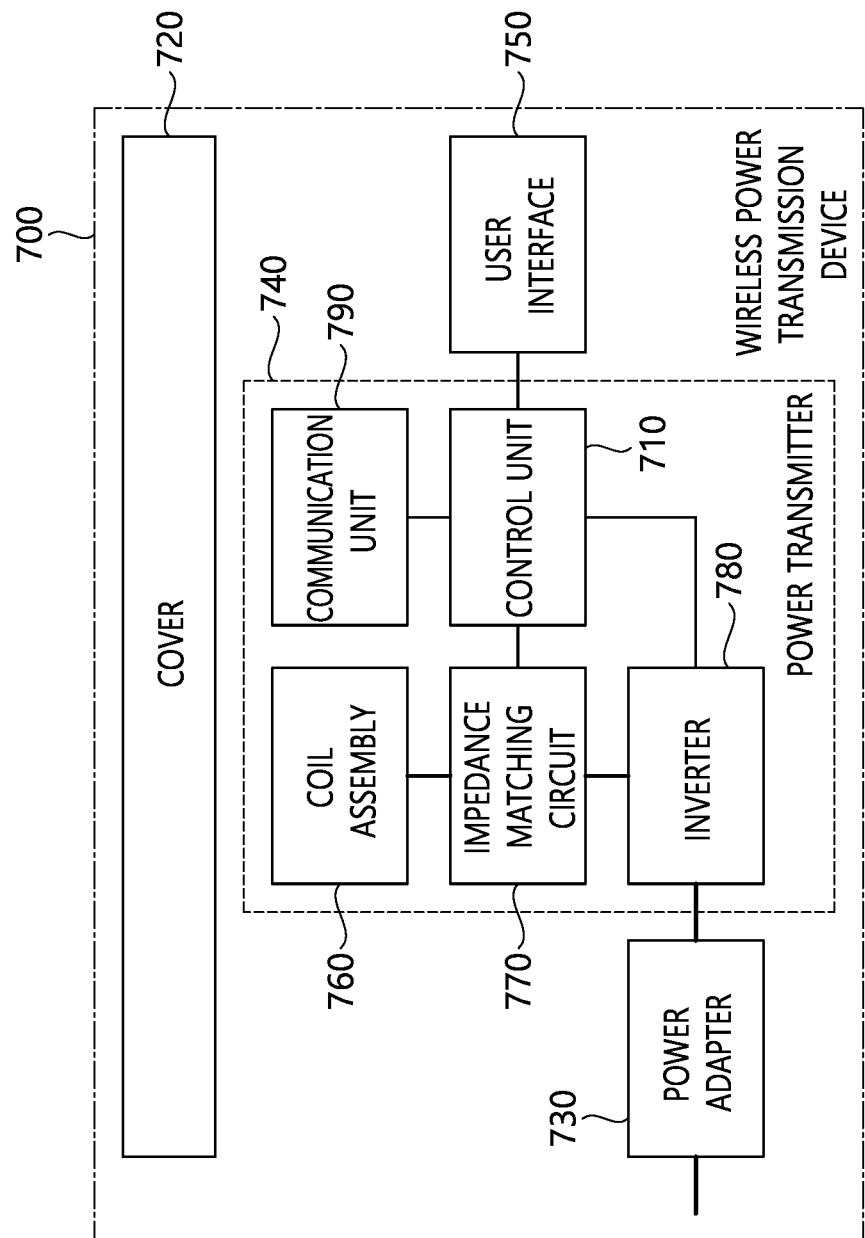
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
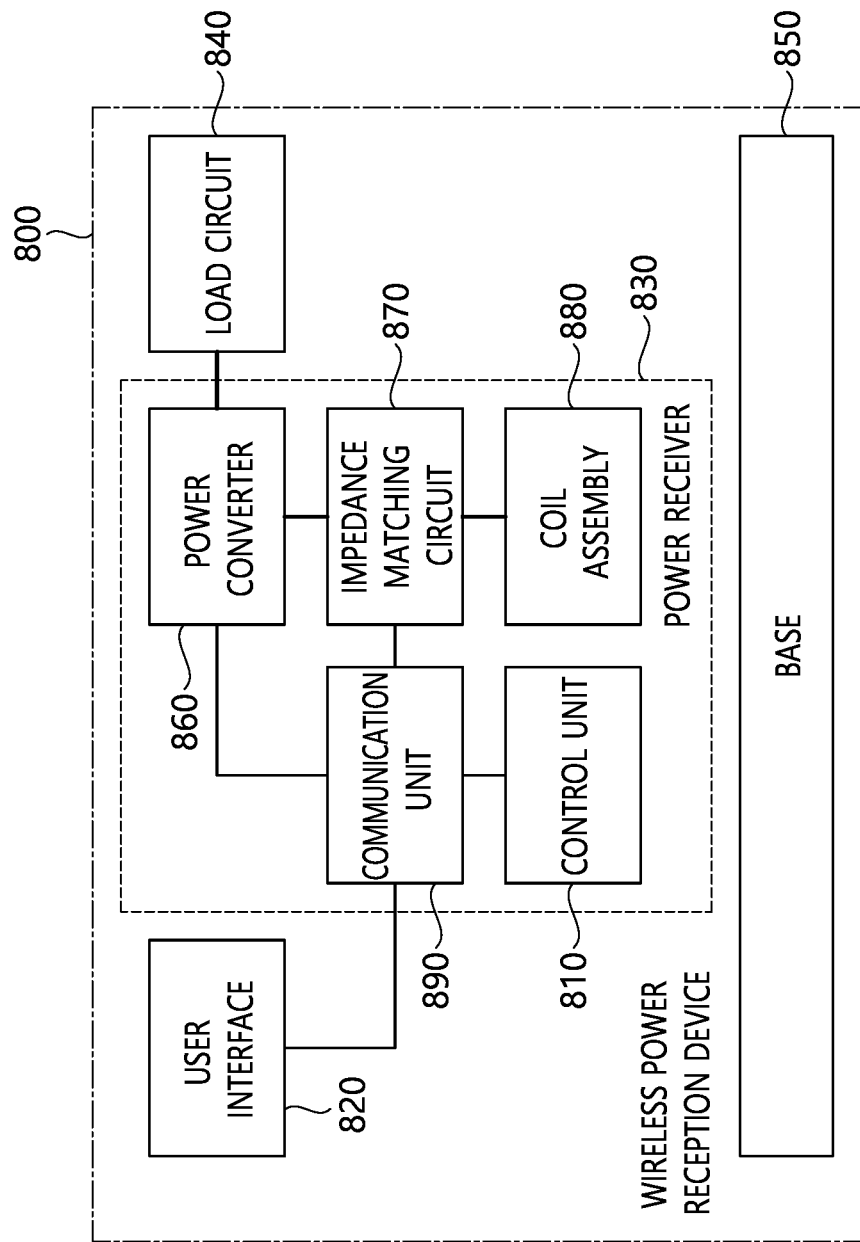
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Hereinafter, an authentication protocol between the wireless power transmitter and the wireless power receiver will be described.

The authentication protocol may be a process of confirming whether the wireless power transmitter and/or the wireless power receiver is an authorized device. For example, the authentication protocol may be a process of confirming whether the wireless power transmitter and/or the wireless power receiver has received Qi authentication of a Wireless Power Consortium (WPC).

Figure 9:
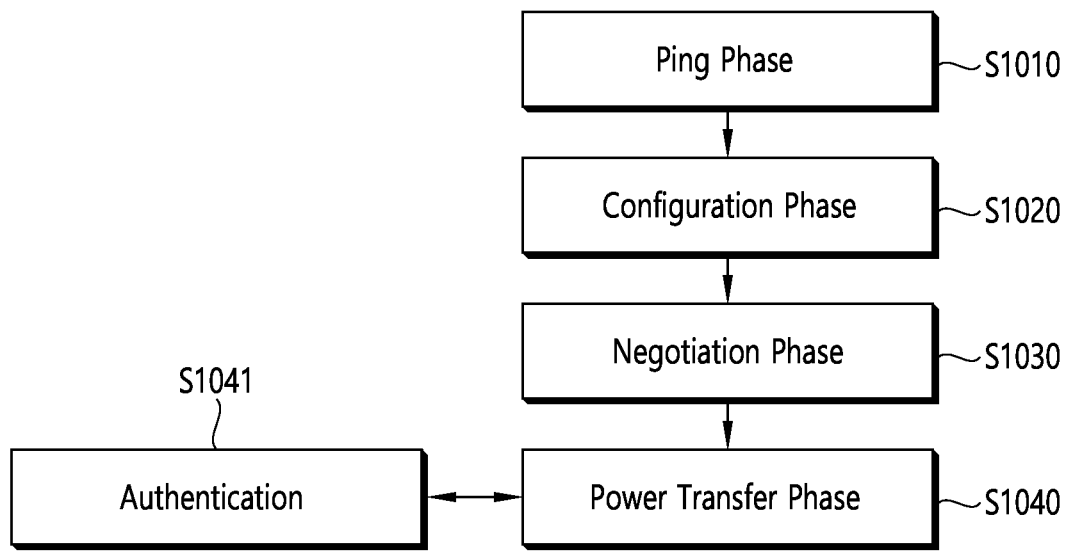
FIG. 9 is a state diagram for explaining a wireless power transmission procedure including an authentication protocol between the wireless power transmitter and the wireless power receiver.

FIG. 9 is a state diagram for explaining a wireless power transmission procedure including an authentication protocol between the wireless power transmitter and the wireless power receiver.

Referring to FIG. 9, a wireless power transmitter and a wireless power receiver that support EPP (Extended Power Profile) and authentication protocol enter the Power Transfer Phase (S1040) after the Ping Phase (S1010), Configuration Phase (S1020) and Negotiation Phase (S1030).

In the ping phase (S1010), the wireless power transmitter identifies the wireless power receiver by transmitting a digital ping. In addition, the wireless power transmitter may perform foreign object detection before power transfer to check whether a foreign object exists in an operating volume. The wireless power receiver receiving the digital ping transmits a signal strength data packet (SIG) to the wireless power transmitter, the wireless power transmitter receiving the SIG from the wireless power receiver 1002 may identify that the wireless power receiver 1002 is located in an operating volume.

In the configuration phase (S1020), the wireless power receiver transmits its identification information to the wireless power transmitter, a wireless power receiver and a wireless power transmitter can establish a baseline Power Transfer Contract. The wireless power receiver may transmit an identification data packet (ID) and an extended identification data packet (XID) to the wireless power transmitter to identify itself, for the power transfer contract, PCH (Power Control Hold-off data packet) and CFG (Configuration data packet) may be transmitted to the wireless power transmitter. The wireless power receiver may indicate to the CFG whether or not it supports the authentication function (AI) and transmit it to the wireless power transmitter.

In the negotiation phase (S1030), the power transfer contract related to the reception/transmission of wireless power between the wireless power receiver and the wireless power transmitter may be expanded or changed, or the power transfer contract that adjusts at least some of the elements of the power transfer contract may be renewed.

In the negotiation phase or the renegotiation phase, the wireless power receiver may receive an identification data packet (ID) and a capabilities data packet (CAP) of the wireless power transmitter using a general request data packet (GRQ).

The GRQ packet includes a 1-byte Requested Power Transmitter Data Packet field (a data packet field of the requested wireless power transmitter). The Requested Power Transmitter Data Packet field may include a header value of a data packet requested by the wireless power receiver to the wireless power transmitter using GRQ.

For example, when the wireless power receiver requests an ID packet of the wireless power transmitter using GRQ, the wireless power transmits the GRQ (GRQ/id) including the header value (0x30) of the ID packet of the wireless power transmitter in the Requested Power Transmitter Data Packet field. The ID packet of the wireless power transmitter includes information on the Manufacturer Code. The ID packet including information on the Manufacturer Code allows the manufacturer of the wireless power transmitter to be identified.

The wireless power receiver may transmit a GRQ (GRQ/cap) requesting the CAP of the wireless power transmitter to the wireless power transmitter. A CAP header value (0x31) may be included in the Requested Power Transmitter Data Packet field of the GRQ/cap.

The wireless power transmitter receiving the GRQ/cap may transmit the CAP to the wireless power receiver. The CAP of the wireless power transmitter includes information related to the performance of the wireless power transmitter. For example, the CAP of the wireless power transmitter may include information on Negotiable Load Power, Potential Load Power, whether to support simultaneous data reception/transmission (Dup), whether or not authentication function is supported (AR), whether out-band communication is supported (OB), etc.

As described above, the wireless power transmitter checks whether the authentication function of the wireless power receiver is supported through the CFG received from the wireless power receiver in the configuration phase, the wireless power receiver checks whether the wireless power transmitter supports the authentication function through the CAP received from the wireless power transmitter in the negotiation phase.

The wireless power transmitter and the wireless power receiver that have entered the power transfer phase (S1040) transmit/receive wireless power according to the power transfer contract negotiated in the negotiation phase (S1030). Before the authentication protocol (S1041) is performed, in a power transfer phase (S1040), transmission/reception of wireless power according to a Baseline Power Profile (BPP) may be performed.

The wireless power transmitter and the wireless power receiver that have entered the power transfer phase (S1040) perform an authentication protocol (S1041), if authentication of the other device is successful through the authentication protocol, the wireless power transmitted/received in the power transfer phase (S1040) may be converted to an Extended Power Profile (EPP).

If authentication of the counterpart device fails through the authentication protocol, power transmission/reception can be stopped, it may transition back to the ping phase (S1010). Alternatively, the power transfer phase (S1040) may be performed, but transmission/reception of wireless power according to a Baseline Power Profile (BPP) may be possible.

The authentication protocol may include authentication of the wireless power transmitter by the wireless power receiver and authentication of the wireless power receiver by the wireless power transmitter.

A message used in the authentication protocol is called an authentication message. The authentication message is used to carry information related to authentication. There are two types of authentication messages. One is an authentication request message (authentication request), and the other is an authentication response message (authentication response).

The authentication request is sent by the authentication initiator, and the authentication response is sent by the authentication responder. The wireless power transmitter and the receiver may be authentication initiators or authentication responders. For example, when the wireless power transmitter is the authentication initiator, the wireless power receiver becomes the authentication responder, when the wireless power receiver is the authentication initiator, the wireless power transmitter becomes the authentication responder.

The authentication request message may include GET_DIGESTS (i.e. 4 bytes), GET_CERTIFICATE (i.e. 8 bytes), and CHALLENGE (i.e. 36 bytes).

The authentication response message may include DIGESTS (i.e. 4+32 bytes), CERTIFICATE (i.e. 4+certificate chain (3×512 bytes)=1540 bytes), CHALLENGE_AUTH (i.e. 168 bytes), ERROR (i.e. 4 bytes).

The authentication message may be called an authentication packet, authentication data, and authentication control information. In addition, messages such as GET_DIGEST and DIGESTS may be referred to as GET_DIGEST packets, DIGEST packets, and the like.

Figure 10:
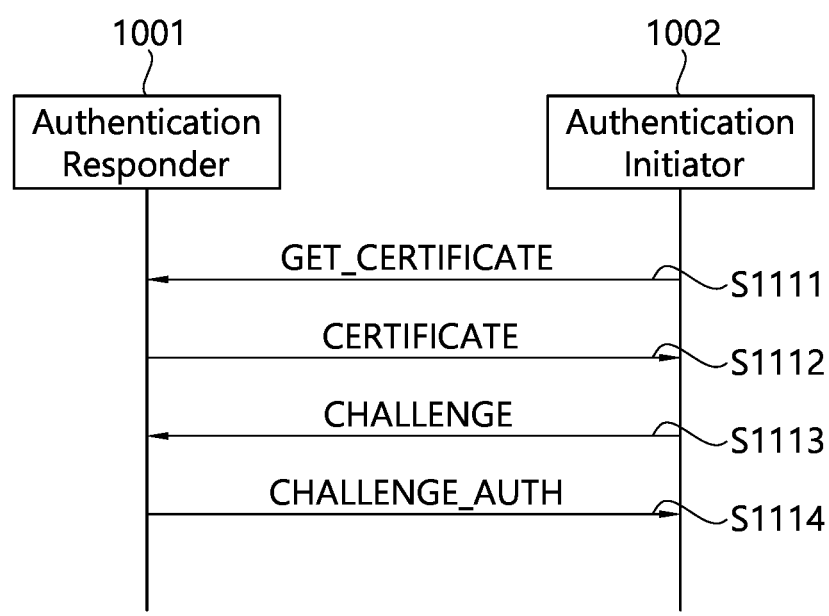
FIG. 10 is a flowchart illustrating an authentication protocol according to an embodiment.

FIG. 10 is a flowchart illustrating an authentication protocol according to an embodiment.

Referring to FIG. 10, the authentication initiator 1002 transmits a certificate request message (GET_CERTIFICATE) to the authentication responder 1001, it may initiate the authentication protocol (S1111). GET_CERTIFICATE is used to read at least a part of the certificate chain of the authentication responder 1001.

The authentication responder 1001 that has received the GET_CERTIFICATE from the authentication initiator 1002 may transmit a certificate message (CERTIFICATE) to the authentication initiator 1002 in response to the GET_CERTIFICATE (S1112). CERTIFICATE may include information about at least a part of the certificate chain requested by GET_CERTIFICATE.

The authentication initiator 1002 that has received the CERTIFICATE from the authentication responder 1001 determines the validity of the certificate chain received from the authentication responder 1001. If the certificate chain is not valid, authentication for the authentication responder 1001 will fail.

If the certificate chain is valid, the authentication initiator 1002 may transmit a challenge message CHALLENGE to the authentication responder 1001 to start authentication of the authentication responder 1001 (S1113).

The authentication responder 1001 receiving the CHALLENGE from the authentication initiator 1002 may transmit a challenge authentication message (CHALLENGE_AUTH) to the authentication initiator 1002 in response to the CHALLENGE (S1114). CHALLENGE_AUTH may include information for authentication (e.g., Certificate Chain Hash LSB, signature related information, etc.).

The authentication initiator 1002 that has received CHALLENGE_AUTH from the authentication responder 1001 finally determines whether the authentication initiator 1002 succeeds in authentication based on the validity of the signature or the like.

Figure 11:
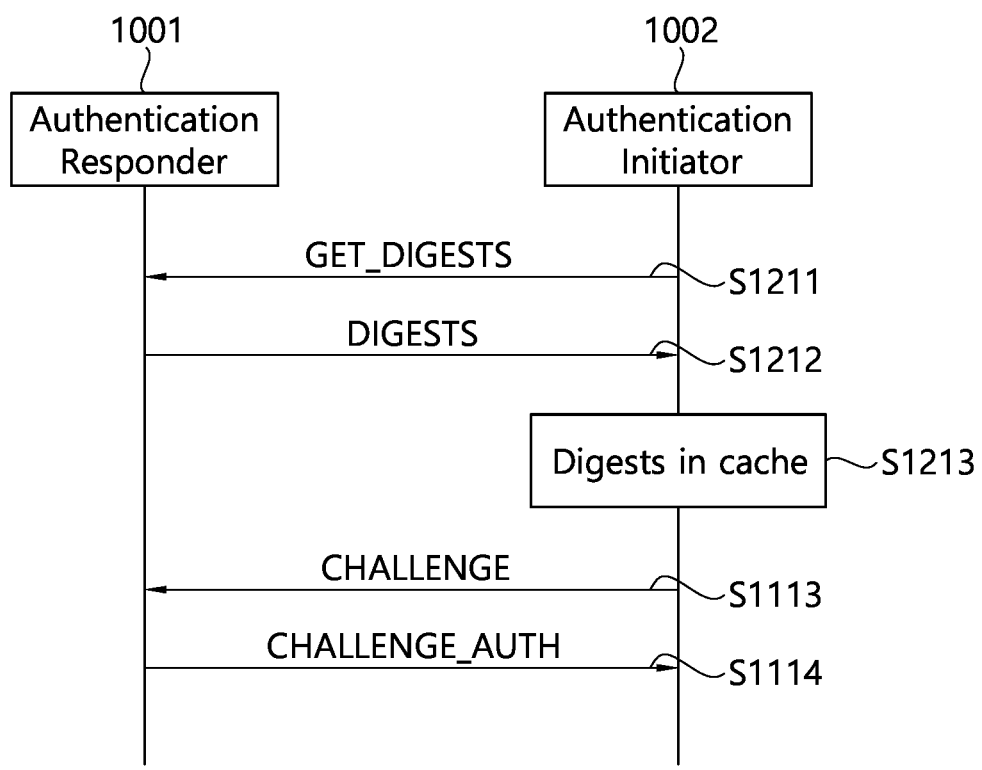
FIG. 11 is a flowchart illustrating an authentication protocol according to another embodiment.

Meanwhile, FIG. 11 is a flowchart illustrating an authentication protocol according to another embodiment.

Referring to FIG. 11, the authentication initiator 1002 may transmit a digest request message (GET_DIGESTS) to the authentication responder 1001 and initiate an authentication protocol (S1211). GET_DIGESTS may be used to retrieve Certificate Chain digests of the authentication responder 1001.

The authentication responder 1001 that has received GET_DIGESTS from the authentication initiator 1002 may transmit a digest message DIGESTS to the authentication initiator 1002 in response to the GET_DIGESTS (S1212). DIGESTS may include information about the certificate chain digest of the authentication responder 1001.

The authentication initiator 1002 that has received DIGESTS from the authentication responder 1001 checks whether the certificate chain digest of the authentication responder 1001 is cached (S1213). If the certificate chain digest of the authentication responder 1001 is cached, the authentication initiator 1002 transmits CHALLENGE to the authentication responder 1001 (S1113), it receives CHALLENGE_AUTH from the authentication responder 1001 (S1114), based on this, it is finally determined whether the authentication initiator 1002 succeeds in authentication. Since the steps S1113 and S1114 have been described above, an additional description thereof will be omitted.

Figure 12:
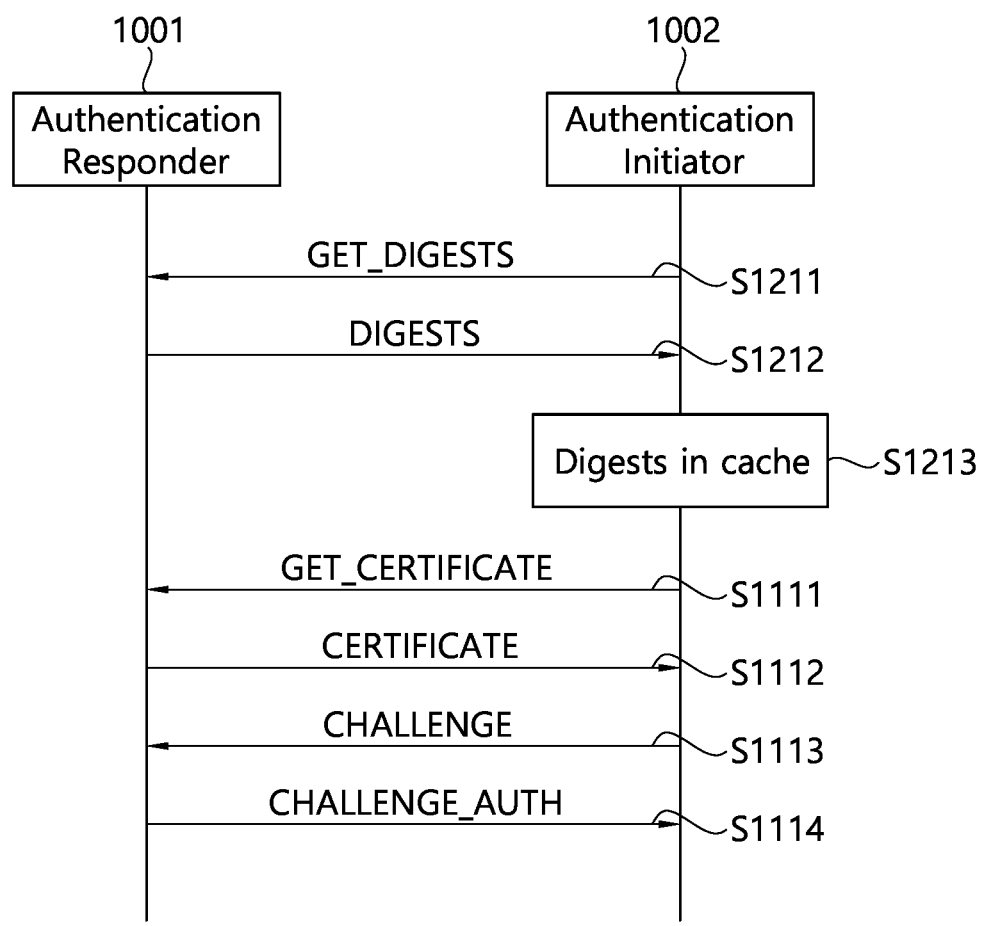
FIG. 12 is a flowchart illustrating an authentication protocol when the certificate chain digest of the authentication initiator is not cached in step S1213.

Meanwhile, FIG. 12 is a flowchart illustrating an authentication protocol when the certificate chain digest of the authentication initiator is not cached in step S1213.

Referring to FIG. 12, steps S1211, S1212, and S1213 have been described above with reference to FIG. 11, and thus an additional description thereof will be omitted.

In step S1213, if the certificate chain digest of the authentication responder 1001 is not cached, the authentication initiator 1002 transmits GET_CERTIFICATE to the authentication responder 1001 (S1111). That is, the authentication protocol proceeds according to the procedure described in FIG. 10. Steps S1111, S1112, S1113, and S1114 have been described above with reference to FIG. 10, and thus additional description thereof will be omitted.

Figure 13:
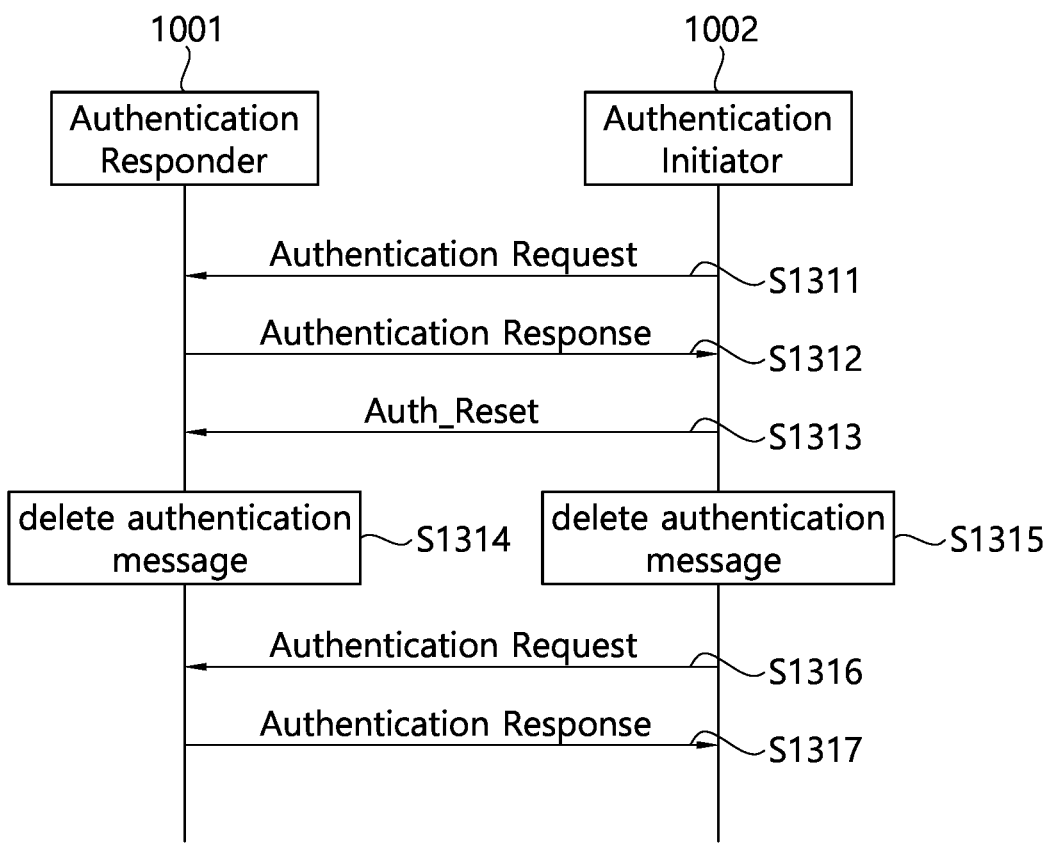
FIG. 13 is a flowchart illustrating an authentication protocol according to an embodiment capable of resetting the authentication protocol.

FIG. 13 is a flowchart illustrating an authentication protocol according to an embodiment capable of resetting the authentication protocol.

Referring to FIG. 13, the authentication initiator 1002 transmits an authentication request message to the authentication responder 1001 (S1311), the authentication responder 1001 transmits an authentication response message to the authentication initiator 1002 in response to the authentication request message (S1312).

Although the transmission/reception of the authentication request message and the transmission/reception of the authentication response message are each shown once in FIG. 13, this is only for convenience of description, as described with reference to FIGS. 10 to 12, the authentication request message (GET_DIGESTS, GET_CERTIFICATE, CHALLENGE) may be transmitted to the authentication responder 1001 one or more times, authentication response messages (DIGESTS, CERTIFICATE, CHALLENGE_AUTH) may also be transmitted to the authentication initiator 1002 one or more times.

Referring to FIG. 13, the authentication initiator 1002 and/or the authentication responder 1001 may transmit a reset message (Auth_Reset) requesting reset of the authentication protocol while the authentication protocol is in progress (S1313).

When it is necessary to restart the authentication protocol such as the received authentication response message is incomplete, or the sent authentication request message is incomplete, or the communication state with the authentication responder 1001 is unstable, or the authentication of the authentication responder 1001 fails, or etc., the authentication initiator 1002 may transmit a reset message to the authentication responder 1001.

After the authentication initiator 1002 transmits a reset message, the already transmitted authentication request message and the already received authentication response message may be deleted from the memory (e.g., the application buffer of the application layer) (S1315). Specific details on this will be described later.

Alternatively, after transmitting the reset message, the authentication initiator 1002 may perform step S1315 after receiving a response (e.g., ACK) to the reset message from the authentication responder 1001.

Alternatively, the authentication initiator 1002 may perform step S1315 after receiving the reset message.

The authentication responder 1001 may transmit a reset message to the authentication initiator 1002 when it is necessary to restart the authentication protocol such as the received authentication request message is incomplete, or the sent authentication response message is incomplete, or the communication state with the authentication initiator 1002 is unstable, or the authentication fails, etc.

After the authentication responder 1001 transmits a reset message, the already received authentication request message and the already transmitted authentication response message may be deleted from the memory (e.g., the application buffer of the application layer) (S1314). Specific details on this will be described later.

Alternatively, after transmitting the reset message, the authentication responder 1001 may perform step S1314 after receiving a response (e.g., ACK) to the reset message from the authentication initiator 1002.

Alternatively, the authentication responder 1001 may perform step S1314 after receiving the reset message.

Figure 14:
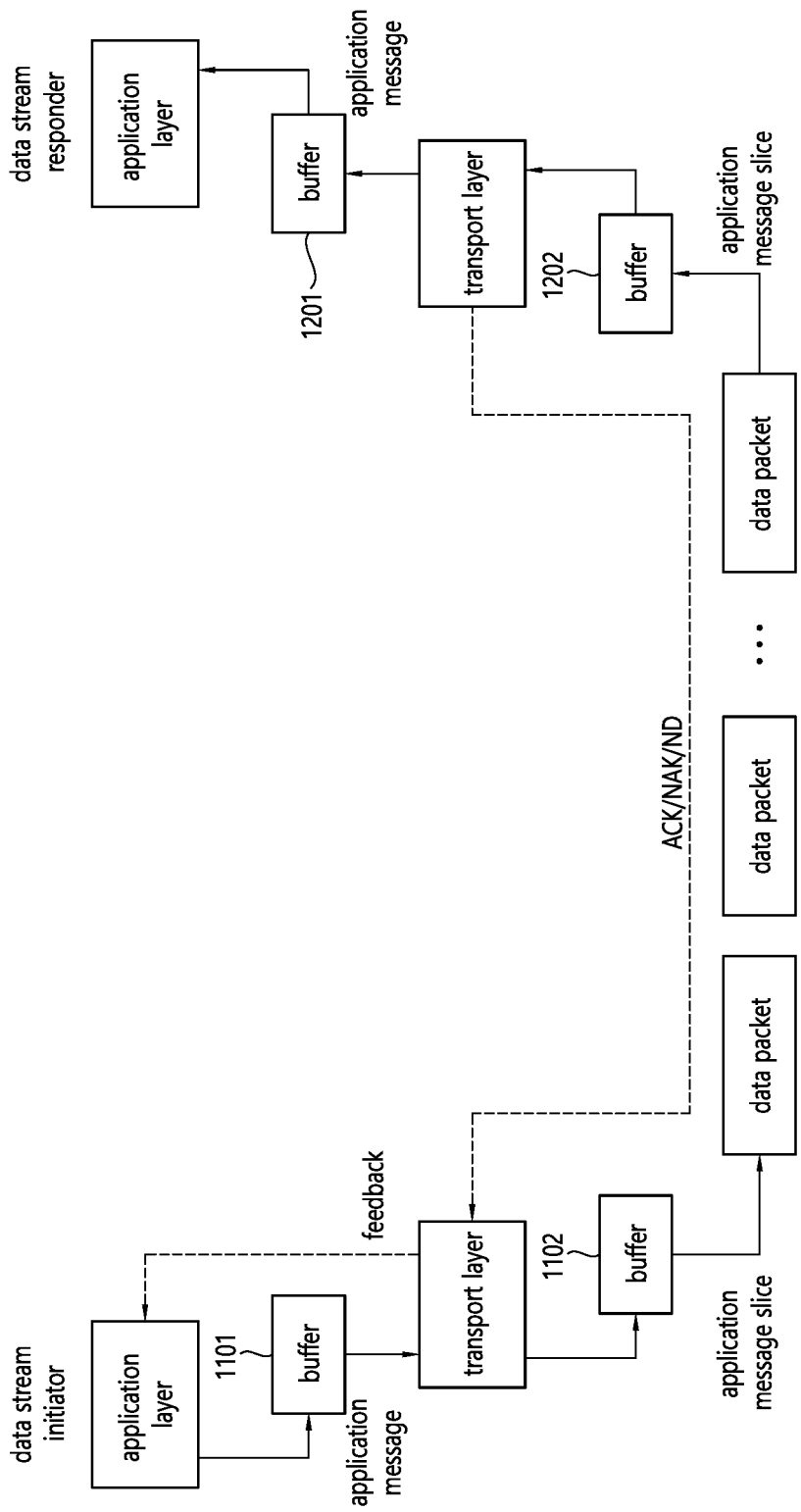
FIG. 14 shows a hierarchical architecture for transmitting/receiving an application-level message between a wireless power transmitter and a wireless power receiver according to an example.

Meanwhile, FIG. 14 shows a hierarchical architecture for transmitting/receiving an application-level message between a wireless power transmitter and a wireless power receiver according to an example.

Referring to FIG. 14, a data stream initiator and a data stream responder transmit/receive a data transport stream obtained by dividing an application-level message into a plurality of data packets using an application layer and a transport layer.

Both the wireless power transmitter and the wireless power receiver may be data stream initiators or responders. For example, if the data stream initiator is a wireless power receiver, the data stream responder is a wireless power transmitter, when the data stream initiator is a wireless power transmitter, the data stream responder is a wireless power receiver.

The application layer of the data stream initiator generates an application-level message (such as an application message, such as an authentication request message or an authentication response message), and it stores it in the application layer buffer 1101 managed by the application layer. And the application layer of the data stream initiator submits the message stored in the application layer buffer 1101 to the transport layer. The transport layer of the data stream initiator stores the received message in the transport layer buffer 1102 managed by the transport layer. The size of the buffer of the transport layer may be, for example, at least 67 bytes.

The transport layer of the data stream initiator transmits an application message to the data stream responder through a wireless channel using a data transport stream. At this time, the application message is sliced into a plurality of data packets and transmitted, a plurality of data packets in which an application message is divided and continuously transmitted may be referred to as a data transport stream.

When an error occurs in the process of transmitting data packets, the data stream initiator may retransmit the erroneous packet, in this case, the transport layer of the data stream initiator may perform feedback on the success or failure of message transmission to the application layer.

The data stream responder receives a data transport stream over a radio channel. The received data transport stream is demodulated and decoded in the reverse process of the procedure in which the data stream initiator transmits an application message to the data transport stream. For example, the data stream responder stores the data transport stream in the transport layer buffer 1202 managed by the transport layer, these are merged and passed from the transport layer to the application layer, the application layer may store the received message in the application layer buffer 1201 managed by the application layer.

Figure 15:
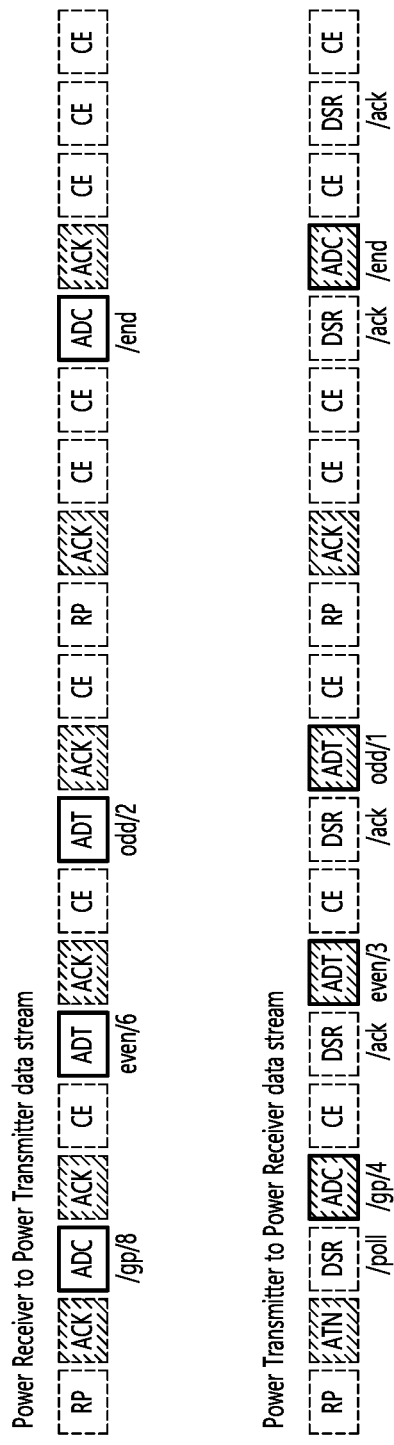
FIG. 15 illustrates a data transmission stream between a wireless power transmitter and a wireless power receiver according to an example.

FIG. 15 illustrates a data transmission stream between a wireless power transmitter and a wireless power receiver according to an example.

Referring to FIG. 15, the data stream may include auxiliary data control (ADC) data packets and/or auxiliary data transport (ADT) data packets.

The ADC data packet is used to open the data stream. The ADC data packet may indicate the type of message included in the stream and the number of data bytes. An ADT data packet, on the other hand, is a sequence of data containing an actual message. ADC/end data packets are used to signal the end of the stream. For example, the maximum number of data bytes in a data transport stream may be limited to 2047.

In order to inform whether ADC data packet and ADT data packet are normally received, ACK or NAC (NACK) is used. Between the transmission timing of the ADC data packet and the ADT data packet, control information necessary for wireless charging, such as a control error packet (CE) or DSR, may be transmitted.

Using this data stream structure, authentication-related information (authentication request message, authentication response message, etc.) or other application-level information may be transmitted/received between the wireless power transmitter and the wireless power receiver.

Referring back to FIG. 13, in performing step S1315, the authentication initiator 1002 may delete authentication-related data (authentication request message and/or authentication response message) stored in the application layer buffer 1101 or 1201.

Also, in performing step S1314, the authentication responder 1001 may delete authentication-related data (an authentication request message and/or an authentication response message) stored in the application layer buffer 1101 or 1201.

After performing step S1315, the authentication initiator 1002 restarts the authentication protocol. That is, the authentication initiator 1002 restarts the authentication protocol with the authentication responder 1001 from the beginning. Therefore, after performing step S1315, the authentication initiator 1002 transmits the first authentication request message required by the authentication protocol to the authentication responder 1001 (S1316), an authentication response message to the authentication request message is received from the authentication responder 1001 (S1317).

In the existing authentication protocol, when authentication fails, wireless charging power is limited to BPP, or wireless charging is stopped. In addition, in order to proceed with the authentication protocol again, there was an inefficient aspect of having to proceed with the protocol for wireless charging from the beginning by transitioning to the ping phase again.

As described above, according to the present specification, the authentication initiator 1002 and/or the authentication responder 1001 may immediately restart the authentication protocol by sending an authentication reset message as needed even if a problem occurs during the authentication protocol.

Also, according to this specification, since the authentication initiator 1002 and/or the authentication responder 1001 deletes the authentication-related data sent and received while proceeding with the authentication protocol based on the transmission/reception of the authentication reset message and restarts the authentication protocol, mixing and/or confusion of data sent and received by the existing authentication protocol and data sent and received by the restarted authentication protocol is prevented.

Meanwhile, FIG. 16 is a diagram illustrating a header format of an authentication message according to an example.

Referring to FIG. 16, an authentication message (authentication request message, authentication response message) has a header format including information on an authentication protocol version (Authentication Protocol Version) and information on a message type (Message Type).

Message type values of authentication response messages may be defined as shown in Table 3 below.

TABLE 3

| Value | Description |
|---|---|
| 0x0 | Reserved |
| 0x1 | DIGESTS |
| 0x2 | CERTIFICATE |
| 0x3 | CHALLENGE_AUTH |
| 0x4...0x6 | Reserved |
| 0x7 | ERROR |
| 0x8...0xF | Used for Authentication requests |

Message type values of authentication request messages may be defined as shown in Table 4 below.

TABLE 4

| Value | Description |
|---|---|
| 0x0-0x7 | Used for Authentication responses |
| 0x8 | Reserved |
| 0x9 | GET_DIGESTS |
| 0xA | GET_CERTIFICATE |
| 0xB | CHALLENGE |
| 0xC...0xF | Reserved |

On the other hand, the reset message (Auth_Reset) transmitted by the authentication initiator 1002 is managed as one of the authentication request messages together with GET_DIGESTS, GET_CERTIFICATE, and CHALLENGE, the reset message (Auth_Reset) transmitted by the authentication responder 1001 may be managed as one of the authentication response messages together with DIGESTS, CERTIFICATE, CHALLENGE_AUTH, and ERROR. In this case, the message type value of the reset message (Auth_Reset) transmitted by the authentication initiator 1002 may be any one of 0x08 or 0xC . . . 0xF. The message type value of the reset message (Auth_Reset) transmitted by the authentication responder 1001 may be any one of 0x0, 0x4 . . . 0x6.

Alternatively, the reset message (Auth_Reset) transmitted by the authentication initiator 1002 and/or the authentication responder 1001 may be managed as an authentication message separate from the authentication request message and the authentication response message.

Meanwhile, FIG. 17 is a diagram illustrating a format of a reset message according to an example.

Referring to FIG. 17, the reset message may include authentication message header information and reset code information. In the reset code information, information on a reason for reset may be classified as a code.

Meanwhile, FIG. 18 is a diagram illustrating a format of an error message (ERROR) according to an example.

Among the authentication response messages transmitted by the authentication responder 1001, there is an error message ERROR. Referring to FIG. 18, the error message ERROR may include authentication message header information, error code information, and error data information.

A reset message (Auth_Reset) transmitted by the authentication responder 1001 may be managed as one of the error messages (ERROR).

Error code information and error data information of the error message ERROR may be defined as shown in Table 5 below.

TABLE 5

| Error Code | Value | Description | Error Data |
|---|---|---|---|
| Reserved | 0x00 | Reserved value | Reserved |
| INVALID_REQUEST | 0x01 | One or more request fields are invalid | 0x00 |
| UNSUPPORTED_PROTOCOL | 0x02 | Requested protocol version is not supported | Maximum supported version |
| BUSY | 0x03 | Device cannot respond now but will be able to respond in the future | 0x00 |
| UNSPECIFIED | 0x04 | Unspecified error has occurred | 0x00 |
| Reserved | 0x09...0xEF | Reserved value | Reserved |
| Manufacturer defined | 0xF0...0xFF | Manufacturer defined (defined by the owner of the Manufacturer Code in the Manufacturer Certificate) | Manufacturer defined |

When the reset message (Auth_Reset) transmitted by the authentication responder 1001 is managed as one of the error messages (ERROR), in the error message to reset the authentication protocol, the error code is Reset, the error code value can be set to any one of 0x00, 0x09 . . . 0xEF, and the error data may be set to 0x00.

The wireless power transmission apparatus in the embodiment according to the above-described FIGS. 9 to 18 corresponds to the wireless power transmission apparatus or the wireless power transmitter or the power transmission unit disclosed in FIGS. 1 to 8. Accordingly, the operation of the wireless power transmitter in this embodiment is implemented by one or a combination of two or more of the respective components of the wireless power transmitter in FIGS. 1 to 8. For example, the reception/transmission of data packets and messages according to FIGS. 9 to 18 are included in the operation of the communication/control unit 120, 710 or 790.

The wireless power receiving apparatus in the embodiment according to the above-described FIGS. 9 to 18 corresponds to the wireless power receiving apparatus or the wireless power receiver or the power receiving unit disclosed in FIGS. 1 to 8. Accordingly, the operation of the wireless power receiver in this embodiment is implemented by one or a combination of two or more of the respective components of the wireless power receiver in FIGS. 1 to 8. For example, the reception/transmission of data packets and messages according to FIGS. 9 to 18 may be included in the operation of the communication/control unit 220, 810, or 890.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A wireless power receiver for receiving a wireless power from a wireless power transmitter comprising:
    a power pickup circuit configured to receive the wireless power from the wireless power transmitter; and
    a communication/control circuit configured to communicate with the wireless power transmitter and control a transmission of the wireless power,
    wherein the communication/control circuit is configured to:
    perform an authentication protocol which transmits an authentication request message to the wireless power transmitter and receives an authentication response message in response to the authentication request message from the wireless power transmitter,
    receive, from the wireless power transmitter, a reset message requesting reset of the authentication protocol while performing the authentication protocol,
    restart the authentication protocol,
    wherein the communication/control circuit is configured to delete the received authentication response message based on the reset message.

2. The wireless power receiver of claim 1, wherein the reset message is included in the authentication response message.

3. The wireless power receiver of claim 2, wherein the authentication request message includes:
    a digest request message (GET_DIGESTS) for retrieving a certificate chain digest of the wireless power transmitter;
    a certificate request message (GET_CERTIFICATE) for reading at least a part of a certificate chain of the wireless power transmitter, and
    a challenge message (CHALLENGE) for starting an authentication of the wireless power transmitter,
    wherein the authentication response message includes:
    a digest message (DIGESTS) including information for the certificate chain digest of the wireless power transmitter in response to the GET_DIGESTS,
    a certificate message (CERTIFICATE) including information for the at least the part of the certificate chain in response to the GET_CERTIFICATE,
    a challenge authentication message (CHALLENGE_AUTH) including authentication information in response to the CHALLENGE,
    an error message (Error) including error information, and
    the reset message.

4. The wireless power receiver of claim 1, wherein the authentication request message includes:
    a digest request message (GET_DIGESTS) for retrieving a certificate chain digest of the wireless power transmitter;
    a certificate request message (GET_CERTIFICATE) for reading at least a part of a certificate chain of the wireless power transmitter, and
    a challenge message (CHALLENGE) for starting an authentication of the wireless power transmitter,
    wherein the authentication response message includes:
    a digest message (DIGESTS) including information for the certificate chain digest of the wireless power transmitter in response to the GET_DIGESTS,
    a certificate message (CERTIFICATE) including information for the at least the part of the certificate chain in response to the GET_CERTIFICATE,
    a challenge authentication message (CHALLENGE_AUTH) including authentication information in response to the CHALLENGE, and
    an error message (Error) including error information,
    wherein the reset message is included in the error message.

5. The wireless power receiver of claim 1, wherein the communication/control circuit is configured to:
    receive the authentication response message from the wireless power transmitter through a transport layer via a data transport stream including a series of auxiliary data transport packets (ADTs) into which the authentication response message is divided and store in a transport layer buffer of the transport layer,
    store the authentication response message stored in the transport layer buffer in an application layer buffer of an application layer, and delete the authentication response message stored in the application layer buffer based on the reset message.

6. The wireless power receiver of claim 1, wherein the communication/control circuit is configured to delete the authentication request message based on the reset message.

7. The wireless power receiver of claim 6, wherein the communication/control circuit is configured to:
   store the authentication request message in an application layer buffer of an application layer,
   store the authentication request message stored in the application layer buffer in a transport layer buffer of a transport layer,
   transmit the authentication request message stored in the transport layer buffer to the wireless power transmitter through a transport layer via a data transport stream divided into a series of auxiliary data transport data packets (ADTs), and
   delete the authentication request message stored in the application layer buffer based on the reset message.

8. A wireless power receiver for receiving a wireless power from a wireless power transmitter comprising:
   a power pickup circuit configured to receive the wireless power from the wireless power transmitter; and
   a communication/control circuit configured to communicate with the wireless power transmitter and control a transmission of the wireless power,
   wherein the communication/control circuit is configured to:
   perform an authentication protocol which transmits an authentication request message to the wireless power transmitter and receives an authentication response message in response to the authentication request message from the wireless power transmitter,
   transmit, to the wireless power transmitter, a reset message requesting reset of the authentication protocol while performing the authentication protocol,
   restart the authentication protocol,
   wherein the communication/control circuit is configured to delete the received authentication response message based on the reset message.

9. A wireless power transmitter for transferring a wireless power to a wireless power receiver comprising:
   a power conversion circuit configured to transfer the wireless power to the wireless power receiver; and
   a communication/control circuit configured to communicate with the wireless power receiver and control a transmission of the wireless power,
   wherein the communication/control circuit is configured to:
   perform an authentication protocol which receives an authentication request message from the wireless power receiver and transmits an authentication response message in response to the authentication request message to the wireless power receiver,
   receive, from the wireless power receiver, a reset message requesting reset of the authentication protocol while performing the authentication protocol,
   wherein the communication/control circuit is configured to delete the authentication response message based on the reset message.

10. The wireless power transmitter of claim 9, wherein the reset message is included in the authentication request message.

11. The wireless power transmitter of claim 10, wherein the authentication request message includes:
   a digest request message (GET_DIGESTS) for retrieving a certificate chain digest of the wireless power transmitter;
   a certificate request message (GET_CERTIFICATE) for reading at least a part of a certificate chain of the wireless power transmitter, and
   a challenge message (CHALLENGE) for starting an authentication of the wireless power transmitter, and
   the reset message.

12. The wireless power transmitter of claim 9, wherein the communication/control circuit is configured to delete the received authentication request message based on the reset message.

13. The wireless power transmitter of claim 12, wherein the communication/control circuit is configured to:
   receive the authentication request message from the wireless power receiver through a transport layer via a data transport stream including a series of auxiliary data transport packets (ADTs) into which the authentication request message is divided and store in a transport layer buffer of the transport layer,
   store the authentication request message stored in the transport layer buffer in an application layer buffer of an application layer, and
   delete the authentication request message stored in the application layer buffer based on the reset message.

14. The wireless power transmitter of claim 9, wherein the communication/control circuit is configured to:
   store the authentication response message in an application layer buffer of an application layer,
   store the authentication response message stored in the application layer buffer in a transport layer buffer of a transport layer,
   transmit the authentication response message stored in the transport layer buffer to the wireless power receiver through a transport layer via a data transport stream divided into a series of auxiliary data transport data packets (ADTs), and
   delete the authentication response message stored in the application layer buffer based on the reset message.

* * * * *